United States Patent
Kotecha et al.

(10) Patent No.: US 11,418,617 B2
(45) Date of Patent: *Aug. 16, 2022

(54) METHOD AND SYSTEM FOR EDGE COMPUTING NETWORK INTERFACING

(71) Applicant: Verizon Patent and Licensing Inc., Basking Ridge, NJ (US)

(72) Inventors: Lalit R. Kotecha, San Ramon, CA (US); Sagiv Draznin, Walnut Creek, CA (US); Priscilla Lau, Concord, CA (US); Arda Aksu, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,576

(22) Filed: Sep. 10, 2020

(65) Prior Publication Data
US 2020/0412832 A1  Dec. 31, 2020

Related U.S. Application Data

(63) Continuation of application No. 16/155,936, filed on Oct. 10, 2018, now Pat. No. 10,805,425.

(51) Int. Cl.
*H04L 67/60* (2022.01)
*H04L 67/10* (2022.01)
*H04L 47/70* (2022.01)

(52) U.S. Cl.
CPC .............. *H04L 67/32* (2013.01); *H04L 47/70* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2003/0187946 A1* | 10/2003 | Cable | H04L 67/34 709/215 |
| 2013/0254258 A1 | 9/2013 | Agarwalla et al. | |
| 2016/0381186 A1* | 12/2016 | Averbuj | H04L 67/101 709/203 |
| 2017/0293538 A1 | 10/2017 | Seenappa et al. | |
| 2017/0295246 A1 | 10/2017 | Georgiou et al. | |
| 2018/0159745 A1 | 6/2018 | Byers et al. | |
| 2018/0183855 A1 | 6/2018 | Sabella et al. | |
| 2018/0234523 A1* | 8/2018 | Jose | H04L 41/06 |
| 2018/0368053 A1 | 12/2018 | Wei et al. | |

(Continued)

OTHER PUBLICATIONS

"Fog computing", Wikipedia, p. 1-5, retrieved Sep. 10, 2018 (Year 2018).

(Continued)

*Primary Examiner* — Joshua Joo

(57) ABSTRACT

A method, a device, and a non-transitory storage medium are described in which a mobile edge computing service is provided. The mobile edge computing service provides for the hosting of a function of an application in a mobile edge computer network, and another function of the application to be hosted in a network external from the mobile edge computer network. The mobile edge computing service includes an on-boarding service that obtains subscription information and policies. The mobile edge computing service also includes network resource availability and security measure verifications.

20 Claims, 20 Drawing Sheets

(56) References Cited

U.S. PATENT DOCUMENTS

| | | |
|---|---|---|
| 2019/0028552 A1* | 1/2019 | Johnson, II ............. H04L 67/02 |
| 2019/0223250 A1 | 7/2019 | Dao et al. |
| 2019/0245789 A1 | 8/2019 | Sabella et al. |
| 2019/0356637 A1 | 11/2019 | Gleichauf |
| 2019/0380028 A1 | 12/2019 | Rasanen |
| 2020/0099742 A1* | 3/2020 | Puente Pestaña ....... H04W 4/02 |
| 2021/0051474 A1* | 2/2021 | Dao ..................... H04L 12/185 |

OTHER PUBLICATIONS

"Fog Computing and the Internet of Things: Extend the Cloud to Where the Thing Are", Cisco, p. 1-6 (Year: 2015). © 2015 Cisco and/or its affiliates. All rights reserved This document is Cisco Public.

* cited by examiner

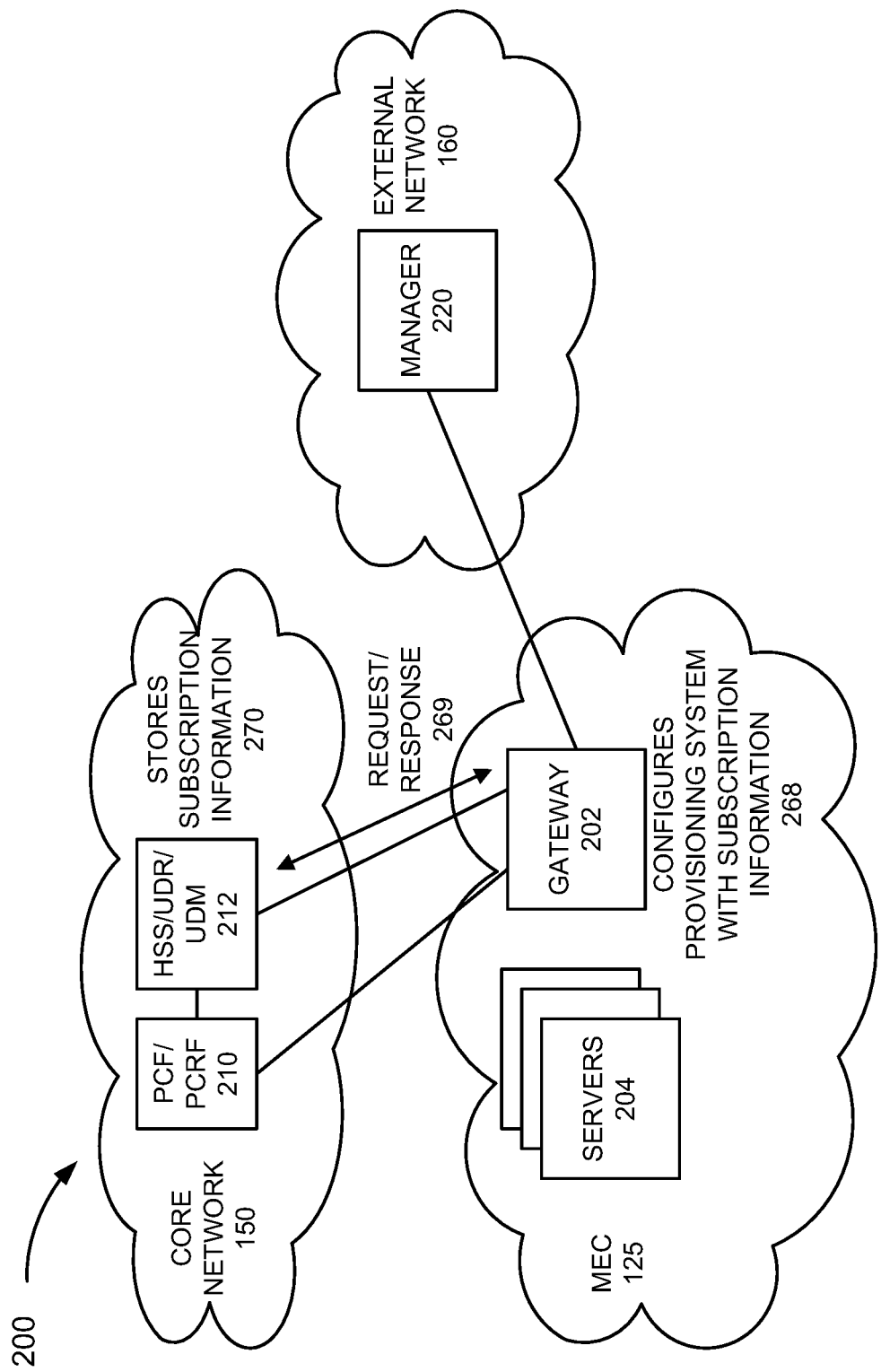

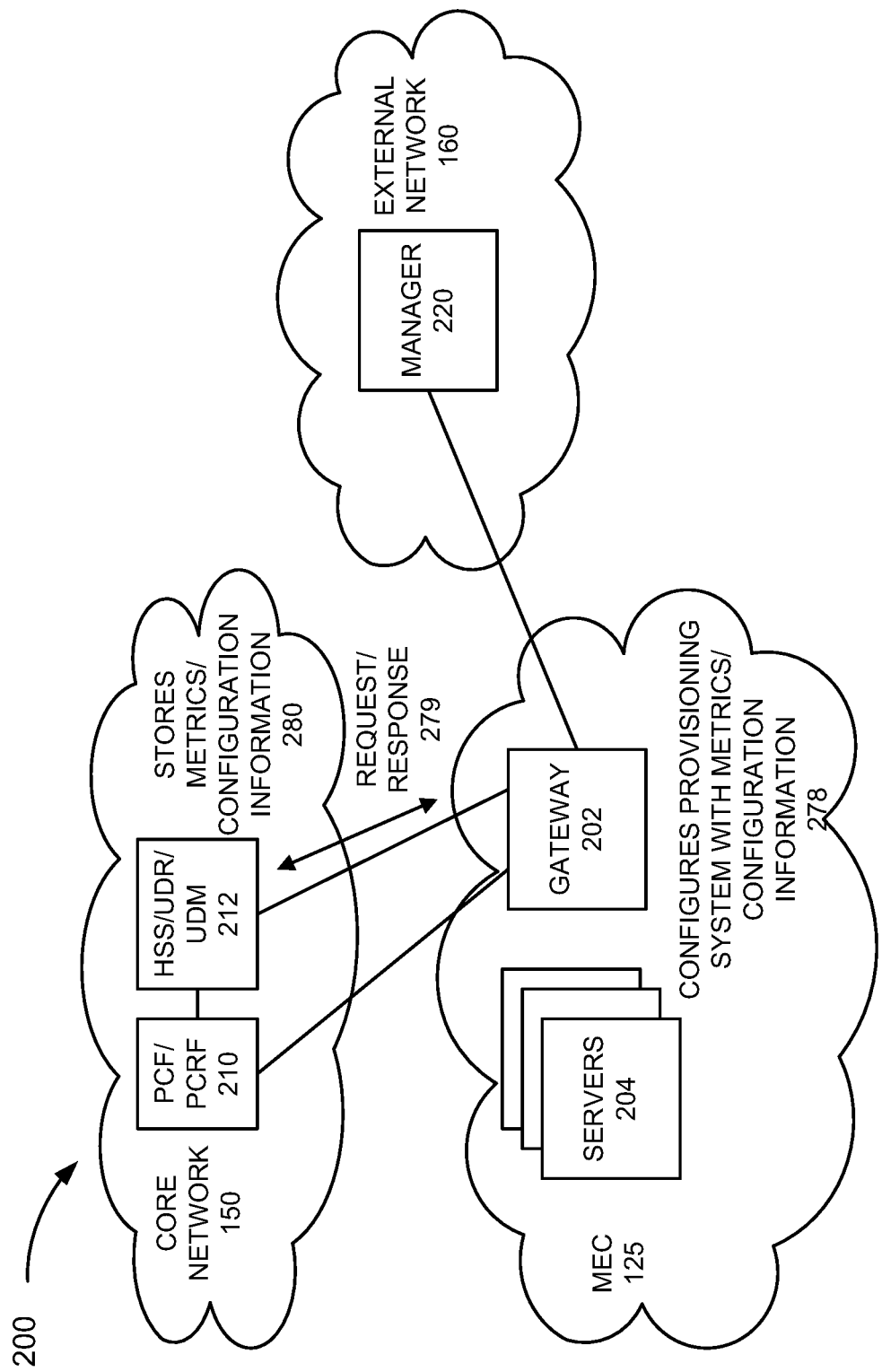

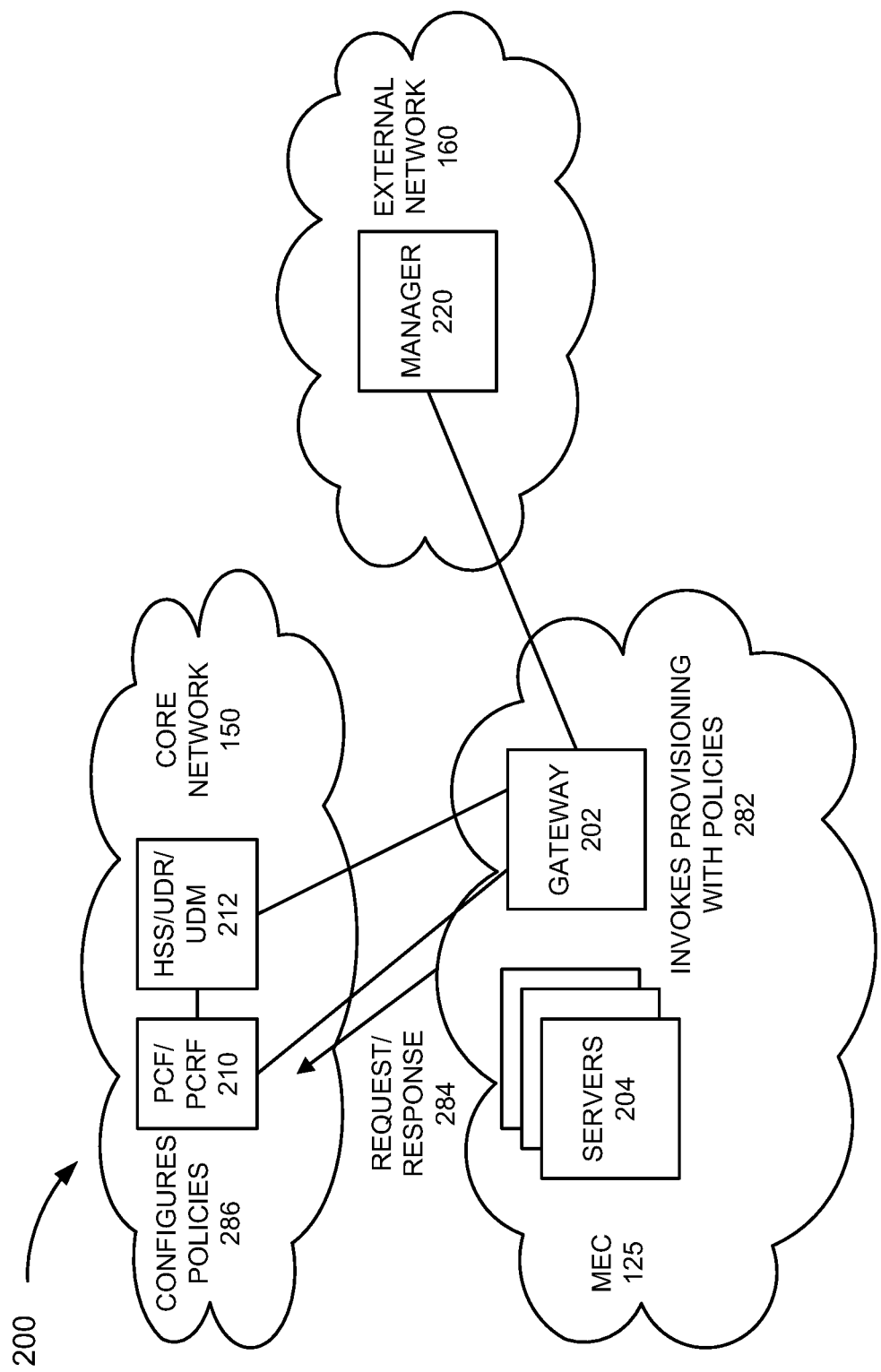

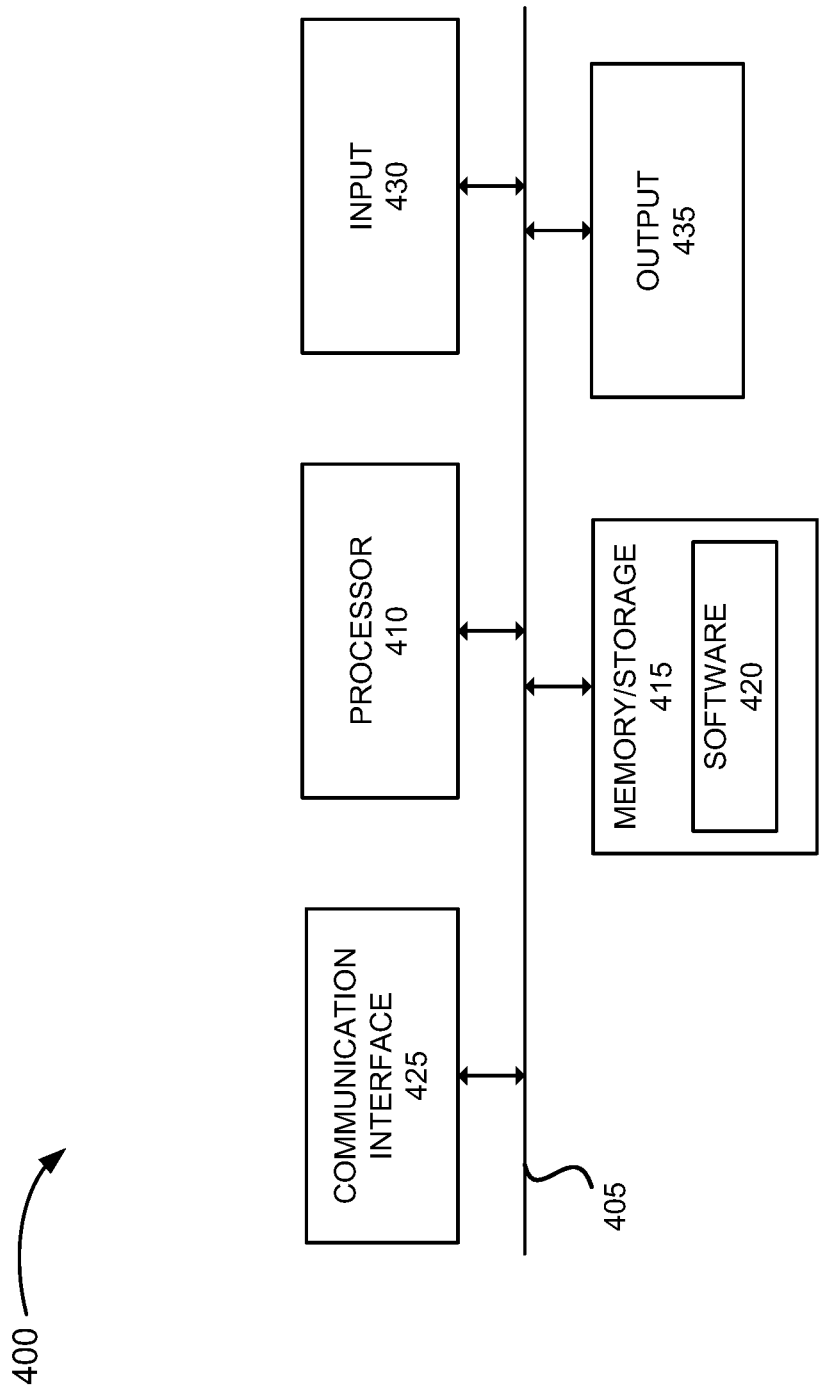

METHOD AND SYSTEM FOR EDGE COMPUTING NETWORK INTERFACING

CROSS REFERENCE TO RELATED APPLICATION

This patent application claims priority to and is a continuation of U.S. patent application Ser. No. 16/155,936, entitled "Method and System for Edge Computing Network Interfacing" and filed on Oct. 10, 2018, the disclosure of which is incorporated by reference herein in its entirety.

BACKGROUND

Development and design of radio access networks (RANs) present certain challenges from a network-side perspective and an end device perspective. In order to enhance performance, multi-access edge computing (MEC) (also known as mobile edge computing (MEC)) is being explored in which core network capabilities (e.g., computational, storage, etc.) are situated at the network edge in order to reduce traffic being sent to the core network.

BRIEF DESCRIPTION OF THE DRAWINGS

FIGS. 2A-2G are diagrams illustrating an exemplary process of an exemplary embodiment of the MEC service according to an exemplary scenario;

FIG. 4 is a diagram illustrating exemplary components of a device that may correspond to one or more of the devices illustrated and described herein;

DETAILED DESCRIPTION OF PREFERRED EMBODIMENTS

Figure 1:
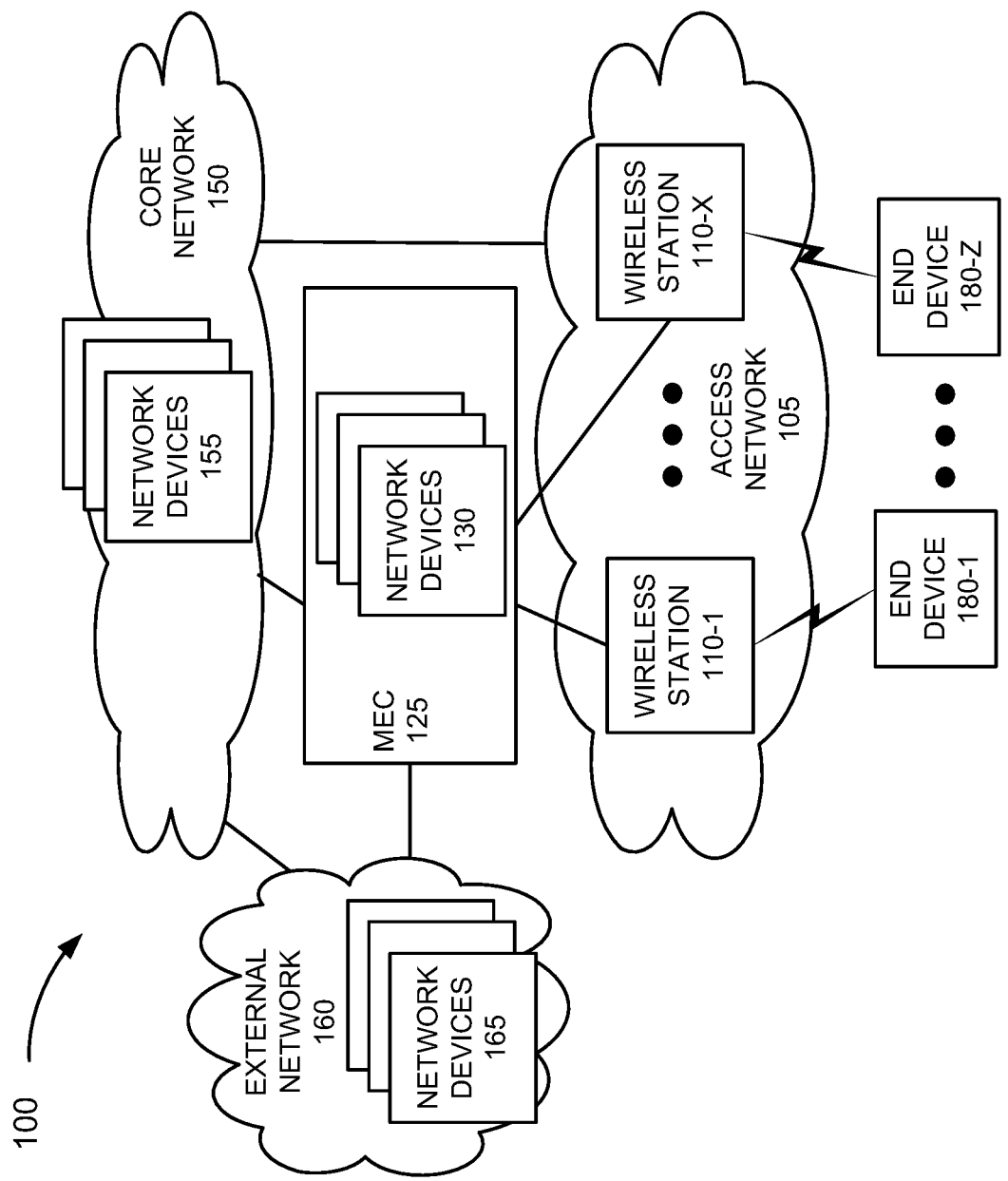
FIG. 1 is a diagram illustrating an exemplary environment in which an exemplary embodiment of a MEC service may be implemented.

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and so forth. In the design of the wireless network, MEC is being considered. The integration of MEC may reduce the traffic sent to and received from the core network because of the local offload that the MEC provides. Additionally, the MEC may provide various services and applications to end devices with minimal latency.

Unfortunately, there may be situations in which a MEC system may need to expose an application or a service (referred to herein simply as an application) available from a network external from the MEC system. For example, the application may be hosted in a public network, a private network, or another type of network that is operated by a third party (e.g., relative to end users and the MEC system). As a result, there are technological problems that need to be addressed, such as provisioning resources in the MEC system, security related issues (e.g., authentication, authorization), satisfying quality of service (QoS) (e.g., latency, bandwidth, etc.), and other access and communication-related issues that pertain to the provisioning of the application to end users by the MEC system.

According to exemplary embodiments, a MEC service is provided. According to an exemplary embodiment, the MEC service is provided by a network device located in a MEC system. According to other exemplary embodiments, the MEC service is provided based on a combination of network devices in which some are part of the MEC system and some are not.

According to an exemplary embodiment, the MEC service provides for the hosting of a portion of an application by the MEC system. For example, the application may provide multiple functions/services of which at least one of the functions/services may be hosted by the MEC system, and the remaining functions/services may be hosted by a network device external from the MEC system. For purposes of description, the application/service may be referred to as a "divided application." As one example, the divided application may include autonomous driving functions that may be hosted by the MEC system (e.g., mission critical control and command functions), while other functions (e.g., vehicle diagnostics, informatics, navigation, etc.) of the divided application may be hosted by the network device of an external network. In this way, the MEC system may host the function of the divided application that requires support for communication metrics relating to bandwidth, latency, priority, class of service, throughput, packet loss, and so forth, of a high or extreme degree, while another function of the divided application, which may not require the same degree of communication metric support, may be hosted outside of the MEC system. According to other examples, the MEC system may host the function of the divided application based on criteria different from communication metrics.

According to an exemplary embodiment, the MEC service provides an on-boarding service for the divided application relative to the MEC system. According to an exemplary embodiment, the MEC service includes a security service in which the network device residing external from the MEC system is authenticated. According to an exemplary embodiment, the MEC service obtains subscription information in relation to a service provider of the divided application. According to an exemplary embodiment, the MEC service provides the subscription information to a provisioning system. For example, the MEC service may provide the subscription information to a home subscriber server (HSS), a unified data management (UDM) device, a user data repository (UDR) device, or another type of network device having a similar functionality. Additionally, the MEC service may invoke the creation of policy information in relation to a policy control function (PCF), a policy and charging rules function (PCRF), or another type of network device having a similar functionality.

According to an exemplary embodiment, the MEC service includes a distributed provisioning service. According to an exemplary embodiment, in response to a triggering event, the MEC service verifies the availability of network resources of the MEC system for hosting a function of the divided application. According to an exemplary embodiment, the MEC service provides for the provisioning of the function by the MEC system when network resources are available. For example, the MEC service may manage or coordinate communication between the MEC system and a network device of the external network that hosts the divided application. By way of further example, the function of the divided application to be hosted by the MEC system may be pushed from the network device of the external network or pulled by the MEC system, and executed by the allocated network resources of the MEC system. According to an exemplary embodiment, the MEC service provisions the function hosted in the MEC system in accordance with the subscription and policy information.

According to an exemplary embodiment, in conjunction with the provisioning, the network device of the external network may provision, execute, and host another function of the divided application. In this way, the MEC service provides for the dynamic deployment of functions of the divided application at different locations (e.g., in the MEC system and external to the MEC system).

According to an exemplary embodiment, the function of the divided application may be provided to end users via a network slice of the MEC system. According to other exemplary embodiments, the function of the divided application may be provided to end users via a non-network slice framework.

In view of the foregoing, the MEC service provides for the dynamic control, division, functional distribution, and deployment of the divided application. As a result, the MEC service improves network resource utilization. For example, the function of the divided application that can be supported via core network resources and/or an external network may improve network resource allocation and utilization in the MEC system while still satisfying quality of service and various communication metrics (e.g., bandwidth, latency, throughput, etc.) pertaining to that function of the divided application. Conversely, another function of the divided application that is supported by the MEC system may improve network resource allocation and utilization in the core network, and satisfy quality of service and various communication metrics pertaining to that function of the divided application. In this way, the MEC system may not host and waste expensive network resources of the divided application on functions that may not require such a configuration.

FIG. 1 is a diagram illustrating an exemplary environment 100 in which an exemplary embodiment of the MEC service may be implemented. As illustrated, environment 100 includes an access network 105, a MEC network 125, a core network 150, and an external network 160. Access network 105 may include wireless stations 110-1 through 110-X (referred to collectively as wireless stations 110 and individually (or generally) as wireless station 110). MEC network 125 may include network devices 130, core network 150 may include network devices 155, and external network 160 may include network devices 165. Environment 100 further includes end devices 180-1 through 108-Z (referred to collectively as end devices 180 and individually (or generally) as end device 180).

The number, the type, and the arrangement of network devices, and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between end devices 180 and the network/network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a Fifth Generation (5G) RAN, and/or another type of RAN. By way of further example, access network 105 may be implemented to include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. Access network 105 may further include other types of wireless networks, such as a WiFi network, a Worldwide Interoperability for Microwave Access (WiMAX) network, a local area network (LAN), a Bluetooth network, a personal area network (PAN), or another type of network that may be considered a network edge.

According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies (e.g., radio access technology (RAT), etc.), wireless standards, wireless frequencies/bands, and so forth.

Access network 105 may include different and multiple functional splitting, such as options 1, 2, 3, 4, 5, 6, 7, or 8, plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Depending on the implementation, access network 105 may include one or multiple types of wireless stations 110. For example, wireless station 110 may be implemented as an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service.

MEC network 125 includes a platform that provides applications and services at the edge of a network, such as access network 105. MEC network 125 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. Depending on the implementation, MEC network 125 may include, for example, virtualized network functions (VNFs), multi-access (MA) applications/services, and/or servers. MEC network 125 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices, network resources (e.g., storage devices, communication links, etc.). For purposes of illustration and description, network devices 130 include the various types of network devices that may be resident in MEC network 125, as described herein. According to some exemplary embodiments, network devices 130 may be co-located with network devices 155 of core network 150.

According to an exemplary embodiment, at least one of network devices 130 includes logic that provides the MEC service, as described herein. For example, this network device 130 may be implemented as a gateway device or another type of network device.

Core network 150 may include one or multiple networks of one or multiple network types and technologies. Core network 150 may include a complementary network of access network 105. For example, core network 150 may be implemented to include an Evolved Packet Core (EPC) of an LTE, an LTE-A network, an LTE-A Pro network, a next generation core (NGC) network, and/or a legacy core network. Depending on the implementation of core network 150, core network 150 may include various network devices, such as for example, a mobility management entity (MME), a packet gateway (PGW), a serving gateway (SGW), an HSS, an authentication, authorization, and accounting (AAA) server, a PCRF, a charging system (CS), a user plane function (UPF), an access and mobility management function (AMF), a session management function (SMF), a UDM device, an authentication server function (AUSF), a network slice selection function (NSSF), a network repository function (NRF), a PCF, and so forth. According to other exemplary implementations, core network 150 may include additional, different, and/or fewer network devices than those described. For purposes of illustration and description, network devices 155 may include various types of network devices that may be resident in core network 150, as described herein.

External network 160 may include one or multiple networks. For example, external network 160 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices (illustrated as network devices 165) that provide various applications, services, or other type of end device assets, such as servers (e.g., web, application, cloud, etc.), mass storage devices, data center devices, and/or other types of network devices pertaining to various network-related functions. According to an exemplary embodiment, one or multiple network devices 165 host divided applications, as described herein. Additionally, according to an exemplary embodiment, one or multiple network devices 165 support the MEC service, as described herein.

End device 180 includes a device that has computational and wireless communication capabilities. End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a phablet, a wearable device, a vehicle support system, a game system, a drone, or some other type of wireless device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, etc.

FIGS. 2A-2G are diagrams illustrating an exemplary process of the MEC service in an exemplary environment 200 that is consistent with environment 100, as previously described. For example, network devices 130 of MEC network 125 include a gateway 202 and servers 204. Network devices 155 of core network 150 include a PCF/PCRF 210 and an HSS/UDR/UDM 212. Additionally, network device 165 of external network 160 includes a manager device 220. According to this exemplary scenario, the process illustrated and described relates to an on-boarding process of the MEC service.

Figure 2A:
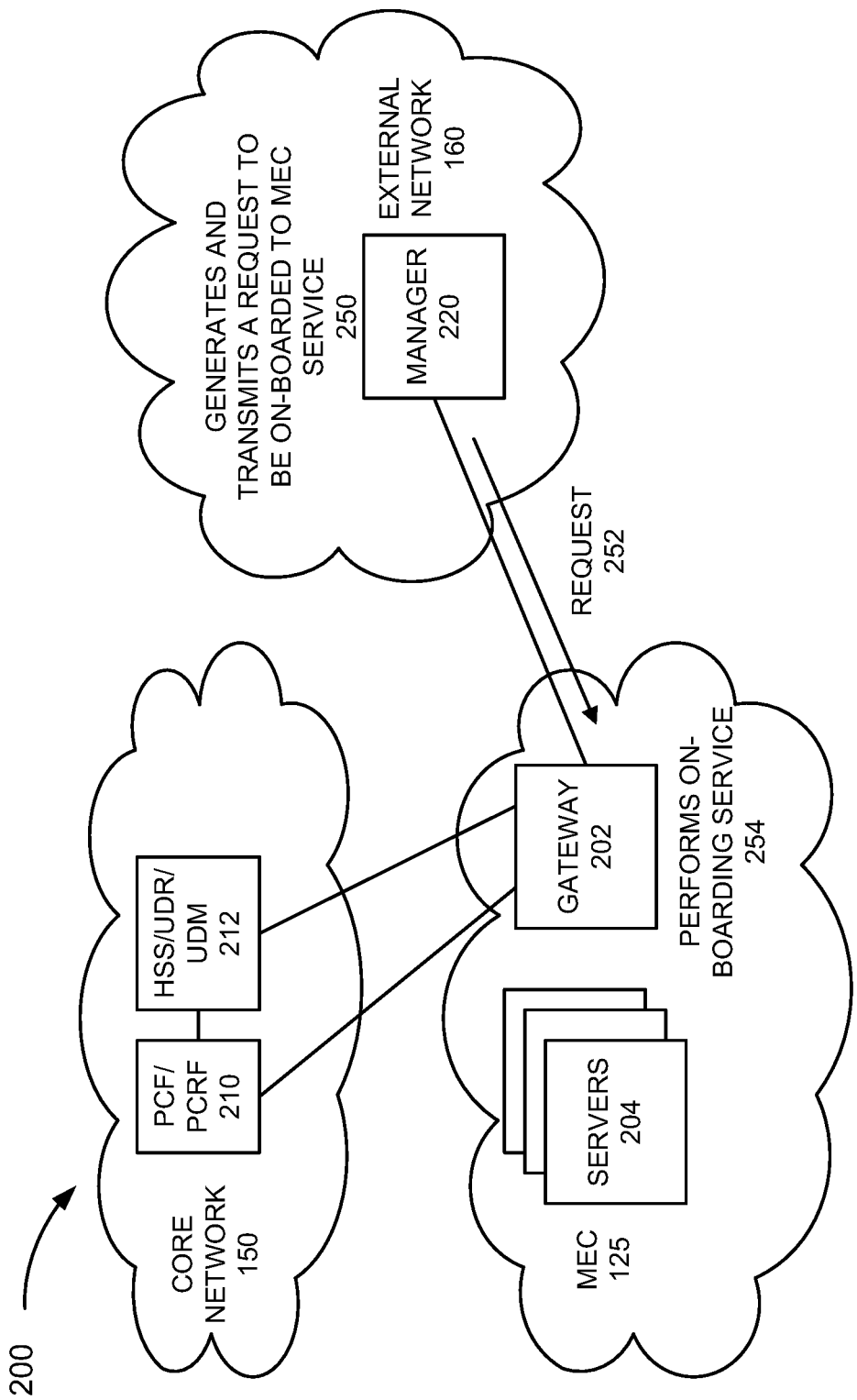

Referring to FIG. 2A, assume that a service provider that hosts a divided application in external network 160 wishes to on-board with the MEC service. Manager device 220 is illustrative of a network device that is configured to perform an on-boarding procedure on behalf of the service provider. According to some exemplary implementation, manager device 220 may be included in a network device that also hosts the divided application, as described herein. According to other exemplary implementations, this may not be the case. For example, manager device 220 may be a network device dedicated to interface with other party or service provider networks. Gateway 202 is configured to perform the on-boarding service of MEC service, as previously described. As illustrated, manager device 220 generates and transmits a request (illustrated as a request 252) to be on-boarded to the MEC service 250. In response to receiving request 252, gateway 202 is triggered to provide an on-boarding service 254.

Figure 2B:
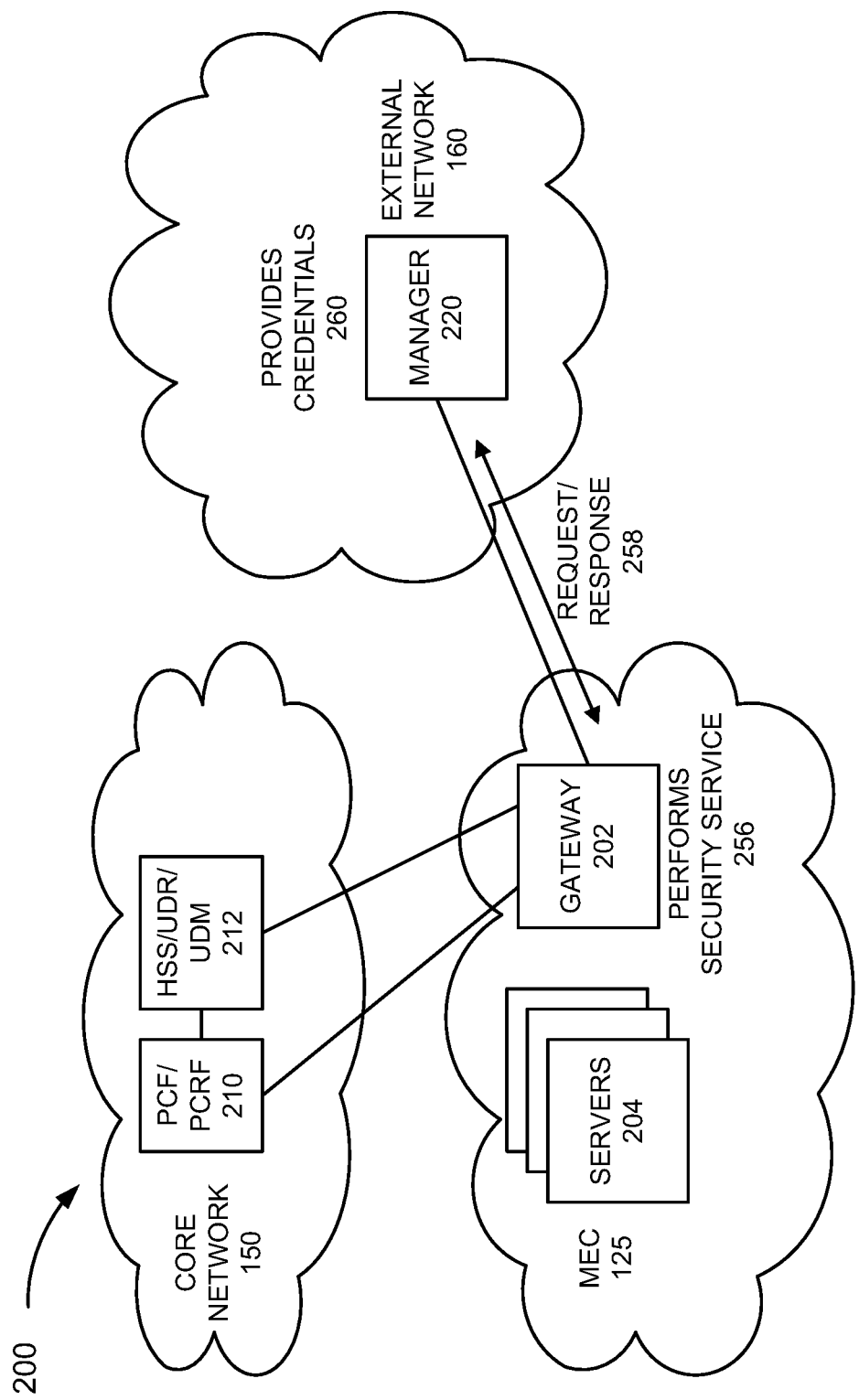

Referring to FIG. 2B, as a part of the on-boarding service, gateway 202 performs a security service 256. For example, various request/response 258 communications may take place between gateway 202 and manager device 220 that relate to one or multiple security measures. By way of further example, gateway 202 may perform, use, and/or ensure authentication, authorization, data integrity, confidentiality, and/or another type of security measure. The security service may be implemented using various technologies such as public keys/private keys, encryption, hashing, tokens, a certificate authority, digital signature, and so forth. According to one example, manager device 220 may provide credentials 260 to gateway 202. According to this exemplary scenario, it may be assumed that the security service was successfully performed relative to manager device 220.

Figure 2C:
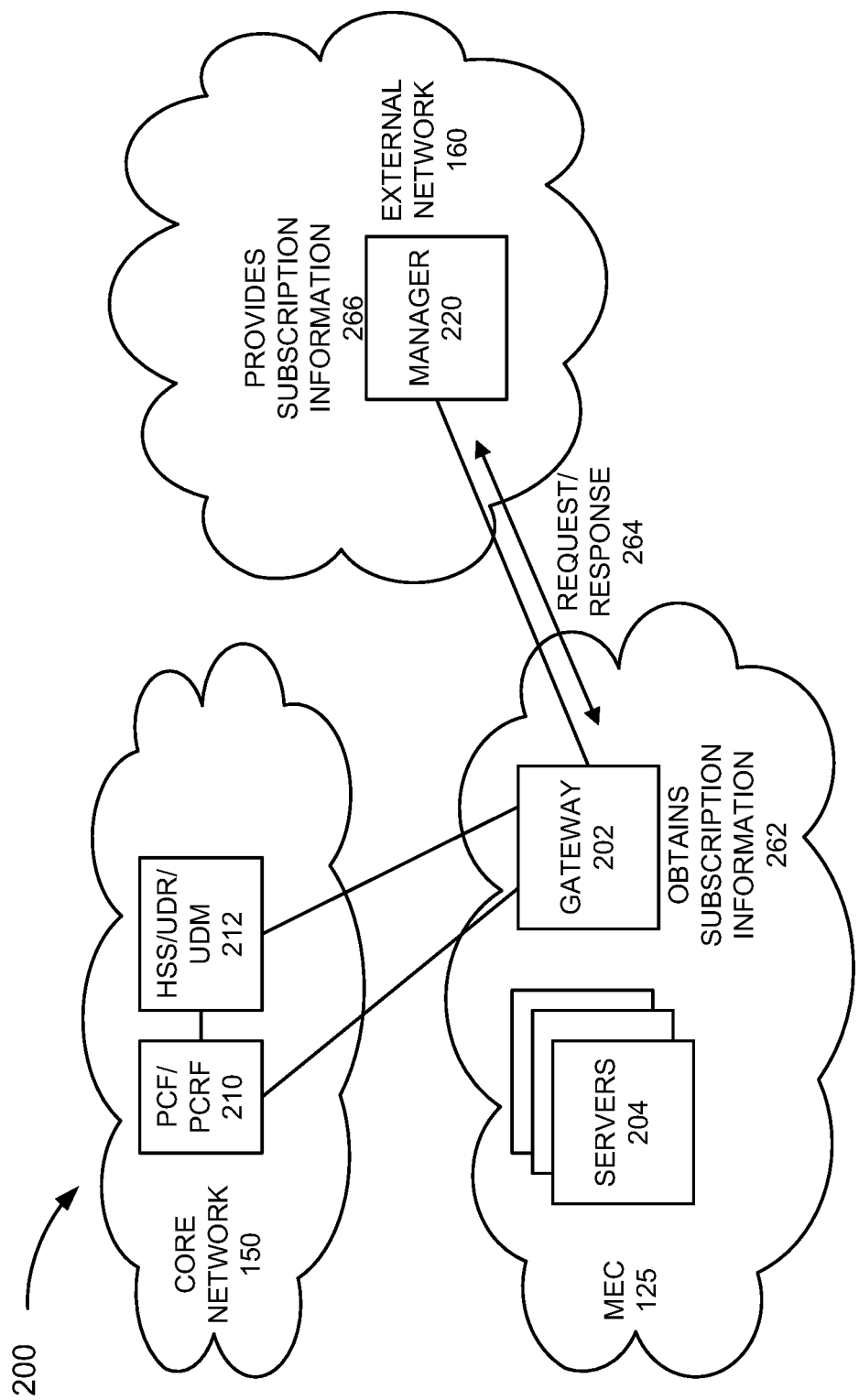

Referring to FIG. 2C, subsequent to the security service being performed, gateway 202 may obtain subscription information 262 from manager device 220. For example, various request/response 264 communications may take place between gateway 202 and manager device 220 in which manager device 220 provides subscription information 266. The subscription information may relate to the service provider of the divided application and the divided application. According to various exemplary implementations, the subscription information may include company information pertaining to the service provider, identification and addressing information pertaining to a network device that hosts the divided application, and user profile information. For example, the user profile information may indicate a tier or a type of subscription service that pertains to communication between external network 160 and MEC network 125, and hosting of a function of the divided application in MEC network 125. The user profile information may also indicate a tier or a type of subscription service that pertains to other network resources (e.g., core network 150, network resources outside of MEC network 125, access network 105, etc.) used for a remaining function of the divided application.

Referring to FIG. 2D, during or subsequent to the obtainment of subscription information, gateway 202 configures HSS/UDR/UDM 212 with the subscription information 268. For example, various request/response 269 communications make take place between gateway 202 and HSS/UDR/UDM 212. HSS/UDR/UDM 212 may store the subscription information 270.

Figure 2E:
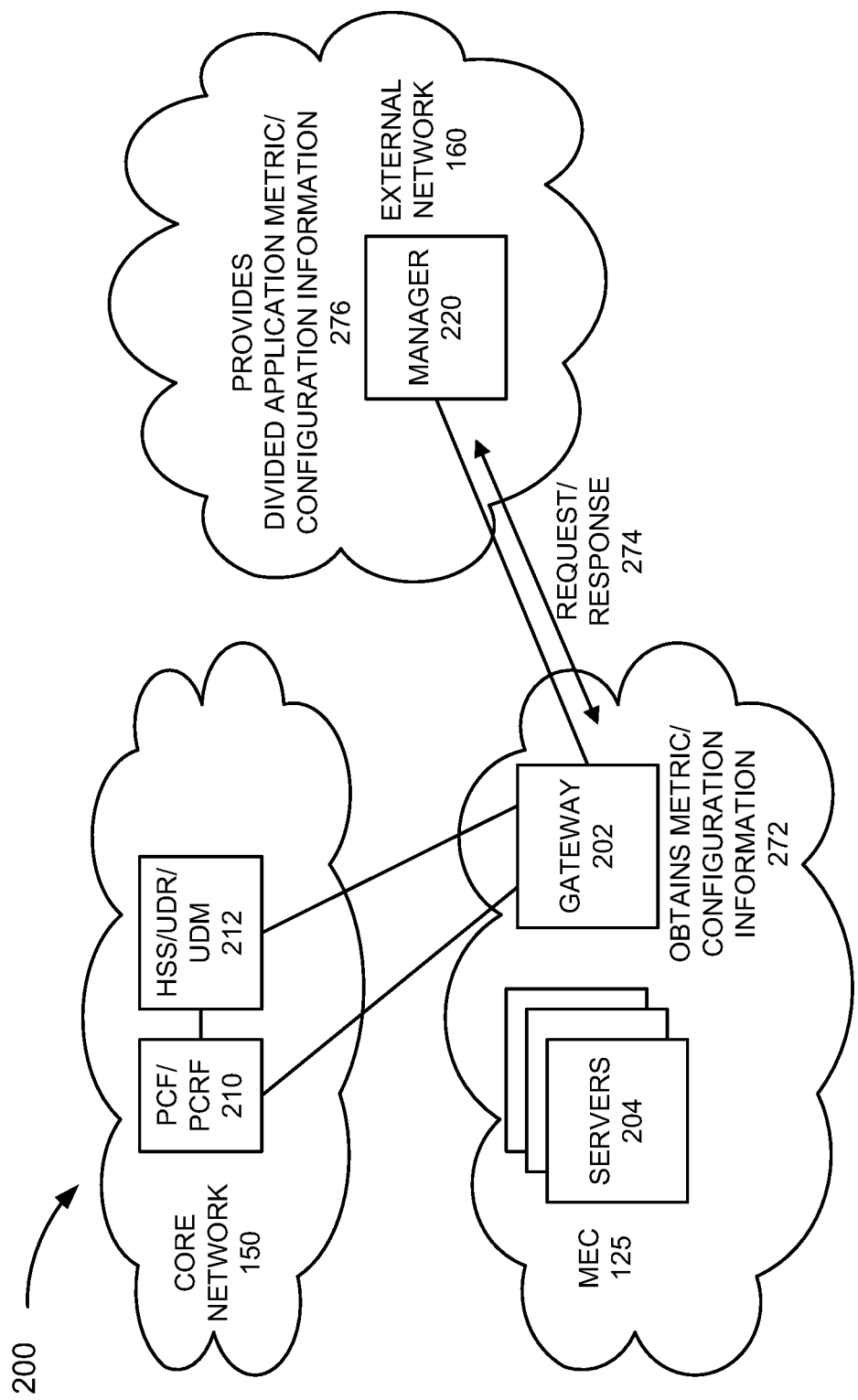

Referring to FIG. 2E, gateway 202 may obtain metric/configuration information 272 from manager device 220. For example, various request/response 274 communications may take place between gateway 202 and manager device 220 in which manager device 220 provides divided application metric/configuration information 276. For example, the metric/configuration information may indicate quality of service information (e.g., a bit rate (e.g., maximum, average, minimum, etc.), traffic class, latency, error rate, drop rate, and/or another type of communication metric) pertaining to the function of the divided application to be hosted in MEC network 125 and, in some exemplary implementations, a remaining function of the divided application to be hosted in external network 160 but using network resources of the MEC service provider (e.g., core network resources, access network resources, etc.), as described herein. The metric/configuration information may also indicate various configurations pertaining to the network device of external network 160 that hosts the divided application, such as a protocol stack, an application programming interface (API), and the like.

Referring to FIG. 2F, during or subsequent to the obtainment of metric/configuration information, gateway 202 configures HSS/UDR/UDM 212 with the information 278. For example, various request/response 279 communications make take place between gateway 202 and HSS/UDR/UDM 212. HSS/UDR/UDM 212 may store the metrics/configuration information 280.

Referring to FIG. 2G, in response to the provisioning of the subscription information, gateway 202 may invoke the provisioning of policies 282. For example, the various request/response 284 communications may take place between gateway 202 and PCF/PCRF 210. In response to the communication, PCF/PCRF 210 configures policies 286 pertaining to the divided application/service provider. For example, although not illustrated, PCF/PCRF 210 may obtain certain subscription information from HSS/UDR/UDM 212, and based on the subscription information, configure various policy control rules (e.g., event triggers, charging related information, quality of service, etc.).

Although FIGS. 2A-2G illustrate an exemplary process of the MEC service, according to other exemplary embodiments, the process may include additional, different, and/or fewer steps. For example, additional, fewer, and/or different instances of information may be obtained or exchanged during the on-boarding process. Additionally, or alternatively, messages other than a request or a response may be used. Additionally, or alternatively, a network device other than HSS/UDR/UDM 212 may be used to store some of the information described. For example, the metrics/configuration information may be stored in a network device other than HSS/UDR/UDM 212.

FIGS. 3A-3H are diagrams illustrating another exemplary process of the MEC service in an exemplary environment 300 that is consistent with environment 100, as previously described. For example, network devices 130 of MEC network 125 include gateway 202, servers 204, and a MEC manager 302. Wireless stations 110 of access network 105 include gNB 304 and eLTE eNB 306. According to this exemplary scenario, the process illustrated and described relates to a distributed provisioning process of the MEC service.

Figure 3A:
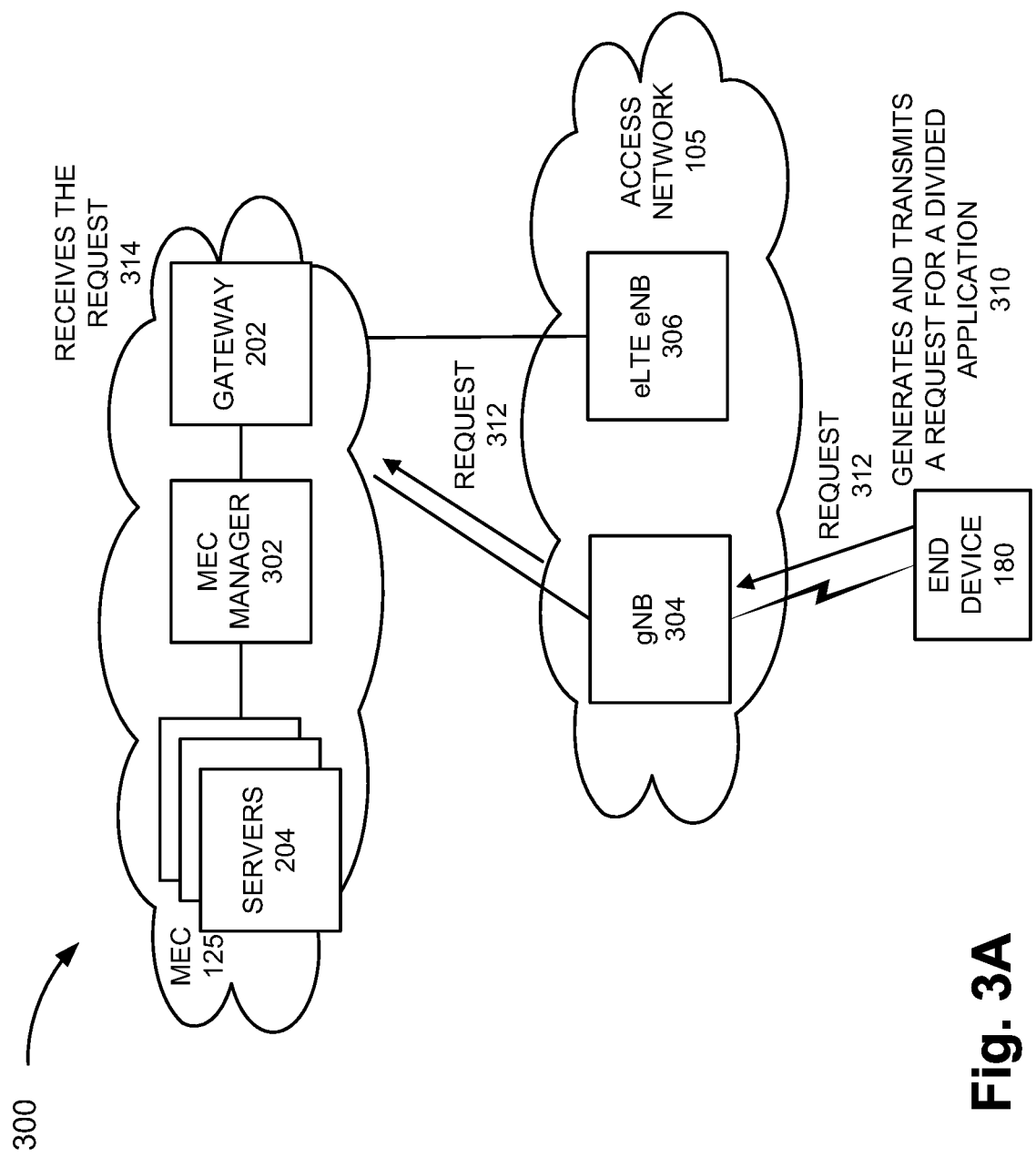
FIGS. 3A-3H are diagrams illustrating another exemplary process of an exemplary embodiment of the MEC service according to an exemplary scenario.
Figure 3B:
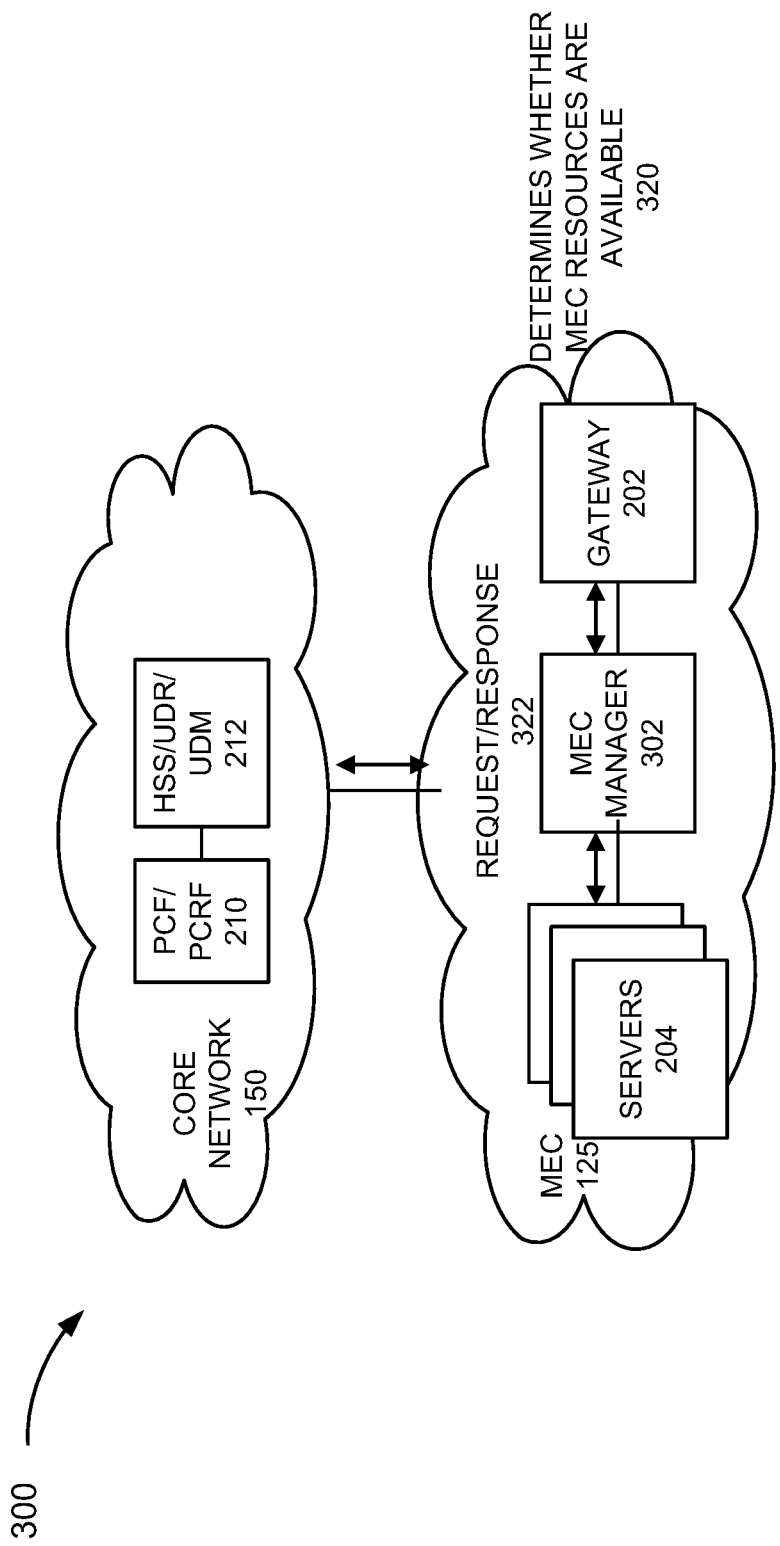

Referring to FIG. 3A, assume end device 180 generates and transmits a request for a divided application 310. A request 312 traverses gNB 304 to MEC network 125. Gateway 202 receives the request 314. Referring to FIG. 3B, in response to receiving request 314, gateway 202 determines whether MEC resources are available 320. For example, various request/response 322 communications may take place between gateway 202 and MEC manager 302, and between MEC manager 302 and HSS/UDR/UDM 212. For example, gateway 202 may generate and transmit a request to MEC manager 302 that queries whether MEC resources are available to support the function of the divided application. The request may include the request received from end device 180. For example, the request may include a unique identifier of end device 180 and data indicating the divided application and/or the function of the divided application. MEC manager 302 may include logic that determines network resource availability in view of the function of the divided application to be hosted. MEC manager 302 may determine what network resources are needed to support the function of the divided application based on the subscription information and the request received from gateway 202. MEC manager 302 may generate and transmit a response that indicates to gateway 202 whether MEC resources are available to support the function of the divided application. According to some exemplary implementation, the determination may also include whether network resources pertaining to a network slice are available.

Figure 3C:
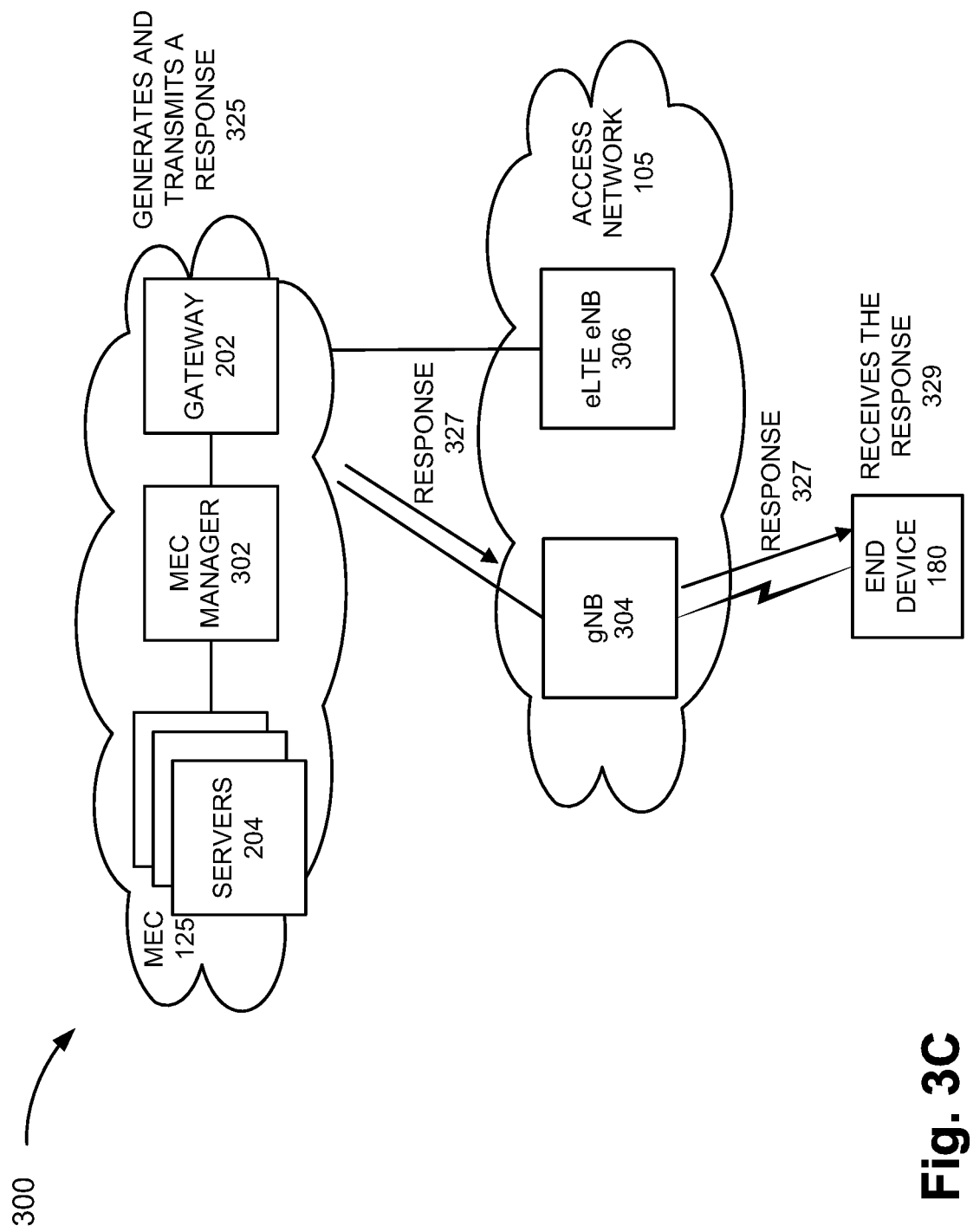

Referring to FIG. 3C, when MEC resources are not available to support the function of the divided application, gateway 202 may generate and transmit a response 325 to end device 180. For example, a response 327 may indicate that the function of the divided application is not available. End device 180 receives the response 329.

Figure 3D:
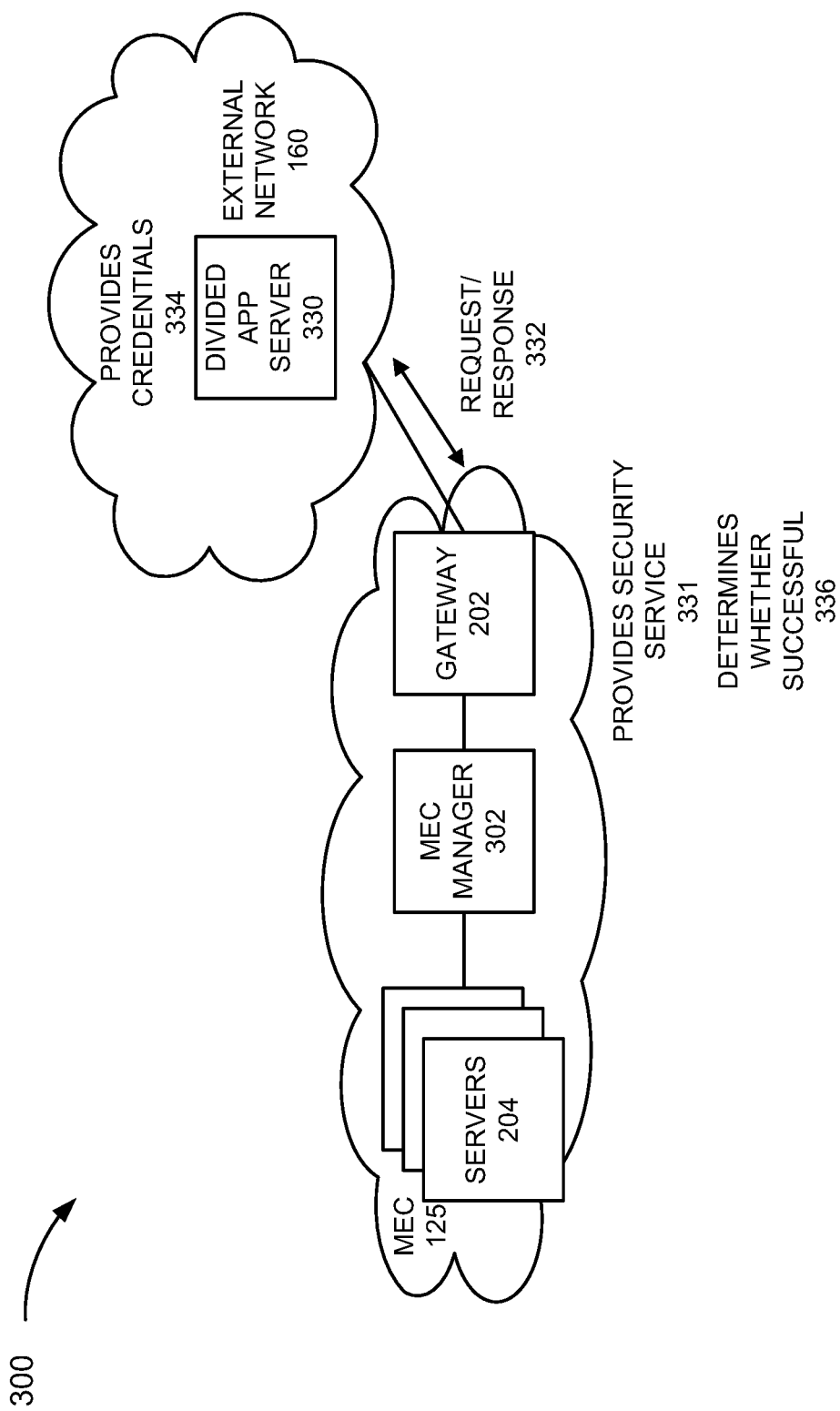

Referring to FIG. 3D, when MEC resources are available, gateway 202 may provide a security service 331. For example, a request/response 332 may be communicated between a divided application server 330 and gateway 202 pertaining to authentication and/or another type of security measure. According to one example, divided application server 330 may provide credentials 334 to gateway 202. Based on the communication with divided application server 330, gateway 202 determines whether the security measure has been successfully completed 336.

Figure 3E:
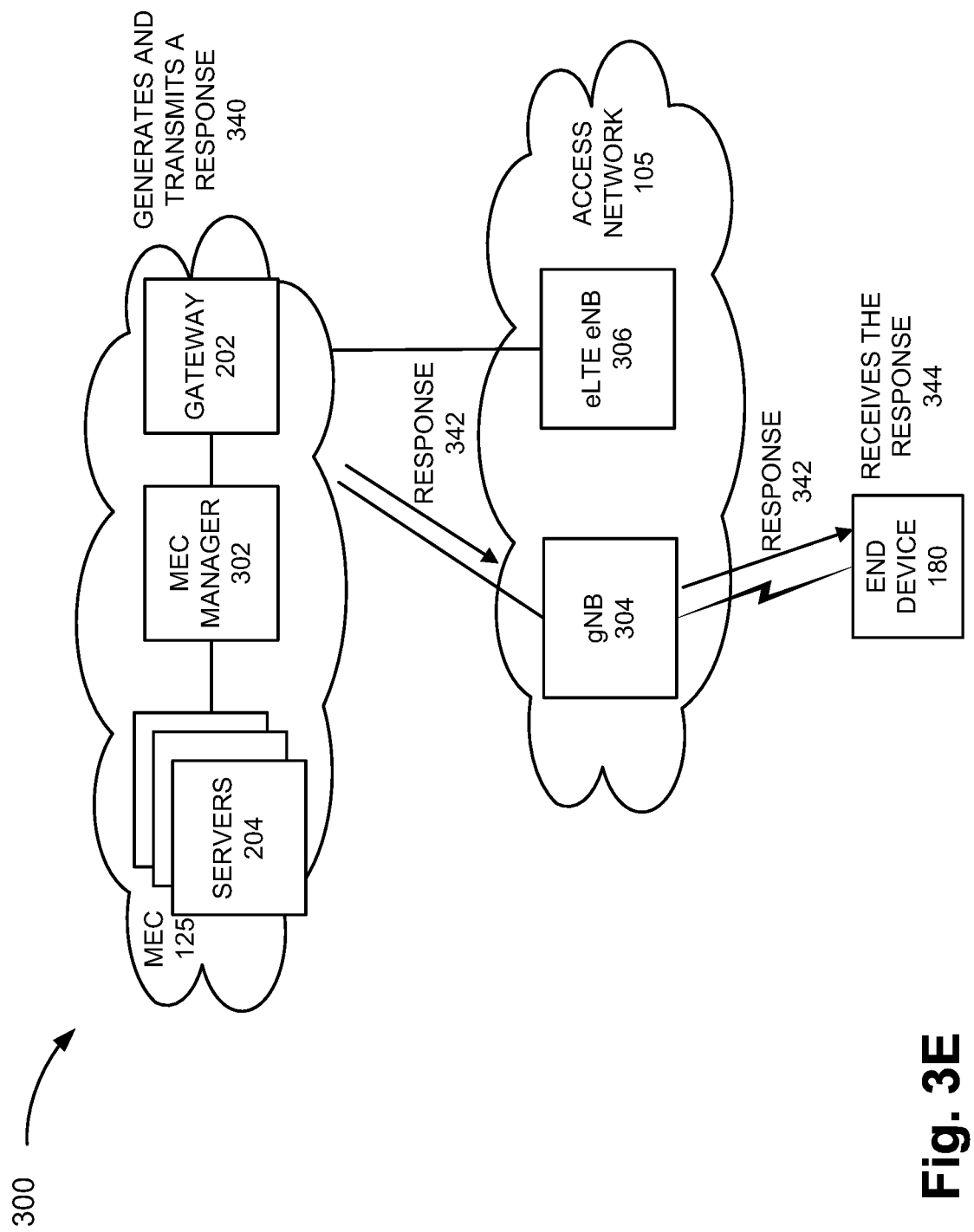

Referring to FIG. 3E, when the security measure is not successfully completed, gateway 202 may generate and transmit a response 340 to end device 180. For example, a response 342 may indicate that the function of the divided application is not available. End device 180 receives the response 344.

Figure 3F:
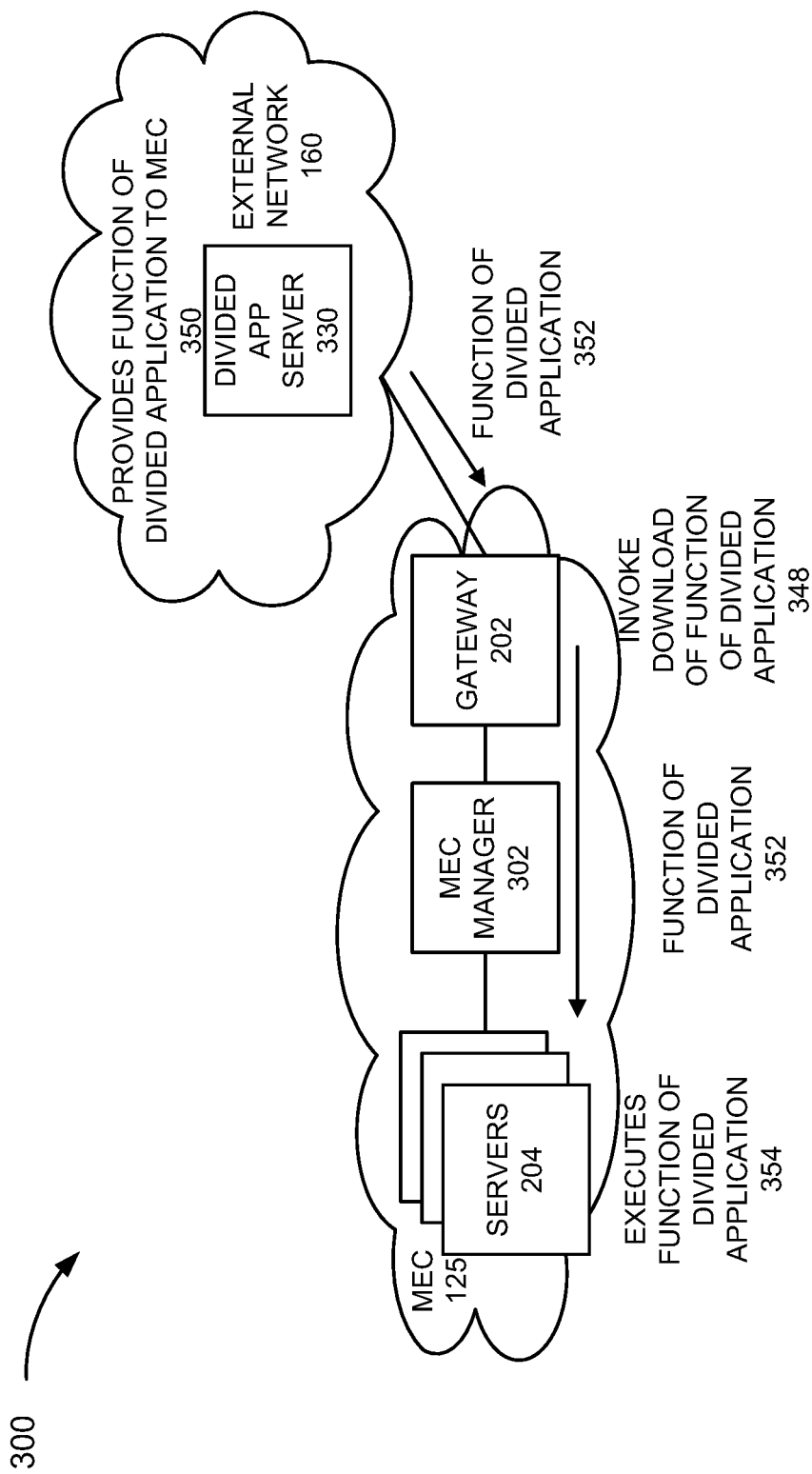

Referring to FIG. 3F, when the security measure is successfully completed, gateway 202 invokes the downloading of the function of the divided application 348. For example, gateway 202 may request that divided application server 330, which hosts the divided application, provide the function of the divided application to MEC 350. Although not illustrated, gateway 202 may also communicate with MEC manager 302 to allocate and configure the MEC resources. According to this example, the function of the divided application 352 may be received by server 204 via gateway 202. Server 204 of MEC network 125 may execute the function of the divided application.

Figure 3G:
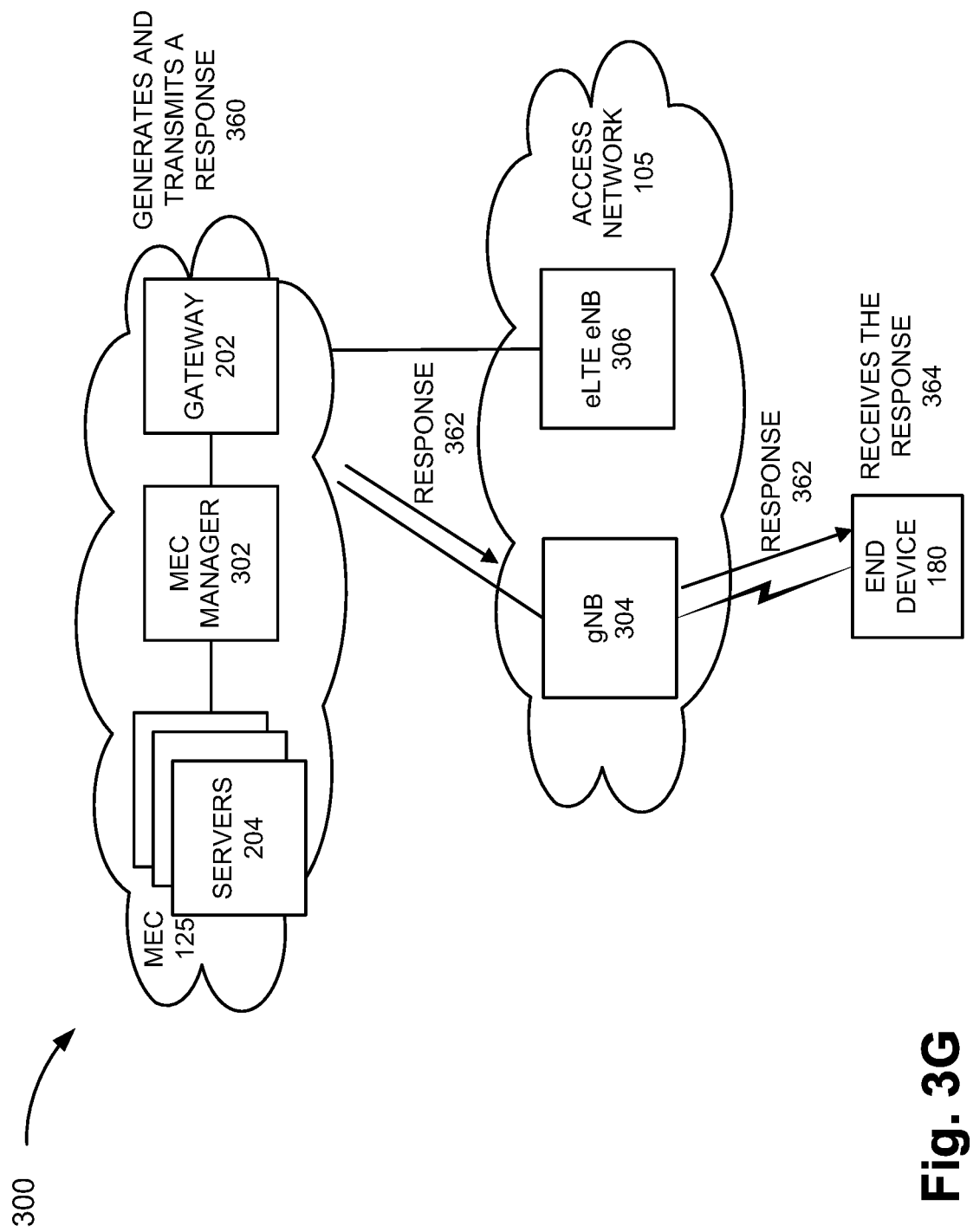
Figure 3H:
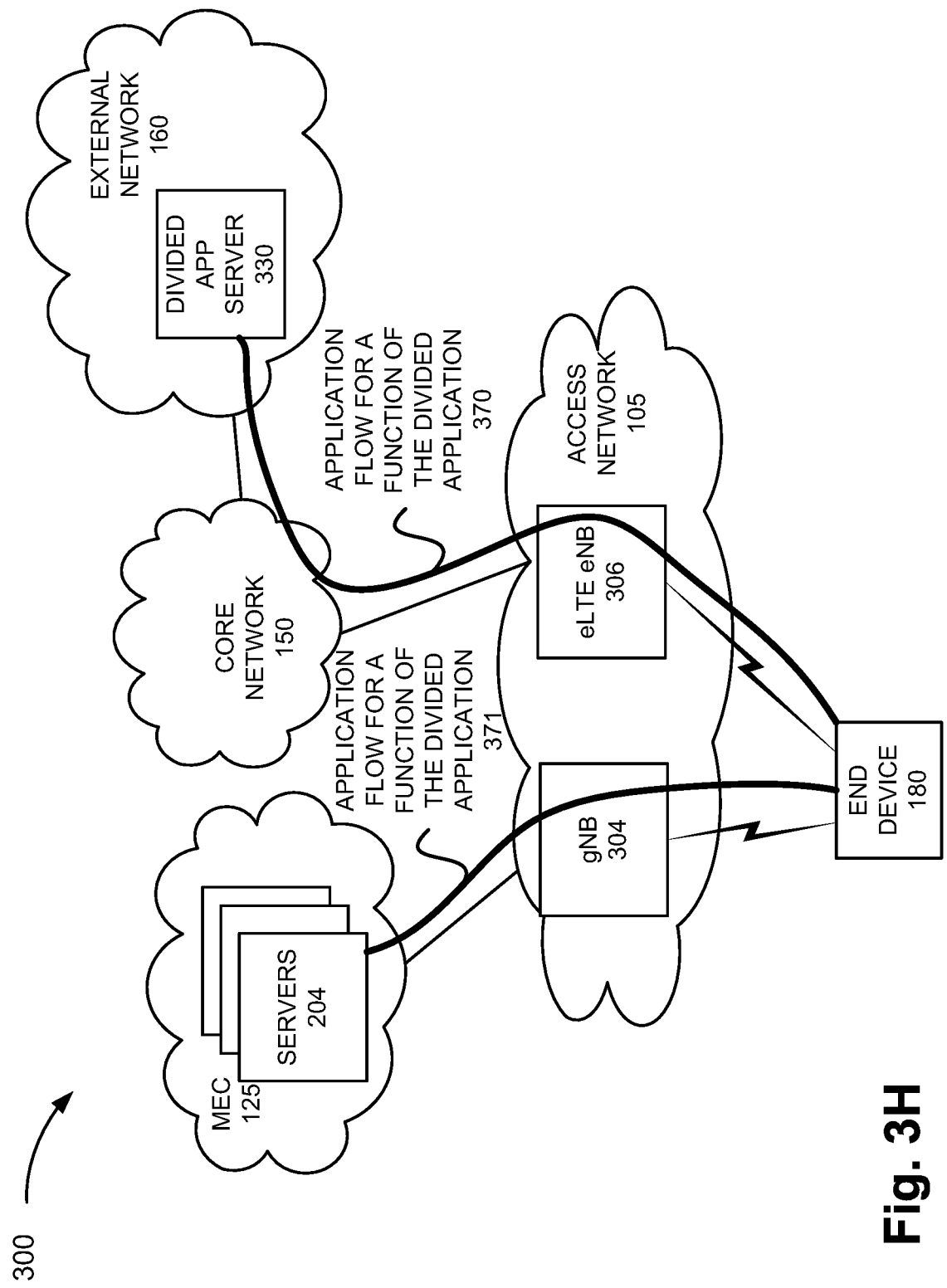

Referring to FIG. 3G, gateway 202 may generate and transmit a response 360 to end device 180. For example, a response 362 may indicate that the function of the divided application is available. End device 180 receives the response 364. Referring to FIG. 3H, according to this exemplary scenario, end device 180 may receive an application flow for a function of the divided application 370 from divided application server 330 of external network 160, and another application flow for a function of the divided application 371 from server 204 of MEC network 125.

Although FIGS. 3A-3H illustrate an exemplary process of the MEC service, according to other exemplary embodiments, the process may include additional, different, and/or fewer steps. For example, gateway 202 may act as an intermediary device in which a security measure may be performed by a security device of MEC network 125 (not illustrated), such as an authentication server, etc. Additionally, or alternatively, messages other than a request or a response may be used.

FIG. 4 is a diagram illustrating exemplary components of a device 400 that may be included in one or more of the devices described herein. For example, device 400 may correspond to components included in wireless station 110, network devices 130 of MEC network 125, network devices 155 of core network 150, network devices 165 of external network 160, end device 180, gateway 202, and other network devices described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/ or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/ storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to gateway 202, software 420 may include an application that, when executed by processor 410, provides a function of the MEC service, as described herein. Additionally, with reference to manager device 220, software 420 may include an application that, when executed by processor 410, provides a function of the MEC service, as described herein. Also, with reference to divided application server 330 and other network devices, as described herein, software 420 may include an application that, when executed by processor 420, provides a function of or facilitates the MEC service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
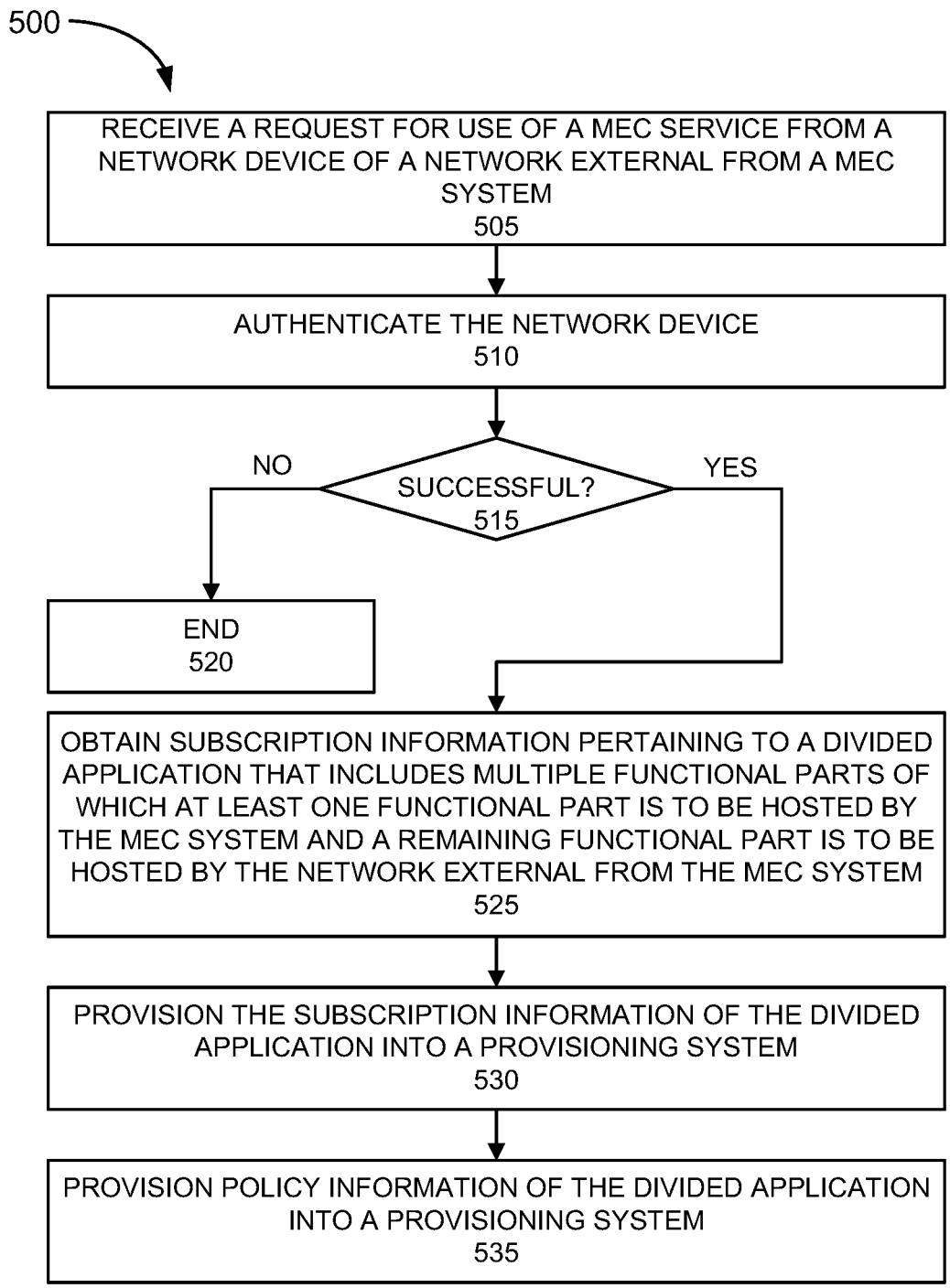
FIG. 5 is a flow diagram illustrating an exemplary process of an exemplary embodiment of the MEC service.

FIG. 5 is a flow diagram illustrating an exemplary process 500 of an exemplary embodiment of the MEC service. According to an exemplary embodiment, network device 130 of MEC network 125 (e.g., gateway 202) that provides the MEC service as described herein, may performs steps of process 500. For example, processor 410 executes software 420 to perform a step illustrated in FIG. 5, and described herein.

Referring to FIG. 5, in block 505, for example, a request for use of MEC service, from a network device of a network external from a MEC system, may be received. For example, gateway 202 may receive a request from manager device 220 of external network 160.

In block 510, the network device may be authenticated. For example, gateway 202 may perform or use one or multiple security measures (e.g., authentication, etc.) in relation to manager device 220, as previously described.

In block 515, it is determined whether the authentication is successful. For example, gateway 202 may determine whether the one or multiple security measures are successful.

When it is determined that the authentication is not successful (block 515—NO), process 500 may end (block 520). For example, gateway 202 may deny the request for use of the MEC service. Gateway 202 may generate and transmit a response, which indicates denial of the on-boarding service, to manager device 220.

When it is determined that the authentication is successful (block 515—YES), subscription information pertaining to a divided application, which includes multiple functions parts of which at least one functional part is to be hosted by a MEC system, and a remaining functional part is to be hosted by the network device, may be obtained (block 525). For example, in response to the success of the one or multiple security measures performed or used, gateway 202 may obtain subscription information from manager device 220, as previously described.

In block 530, the subscription information of the divided application may be provisioned into a provisioning system. For example, gateway 202 may provide the subscription information to HSS/UDR/UDM 212. According to some exemplary implementations, HSS/UDR/UDM 212 may be co-located in MEC network 125 and core network 150. According to other exemplary implementations, HSS/UDR/UDM 212 may not be co-located in MEC network 125 and core network 150.

In block 535, policy information of the divided application may be provisioned into a provisioning system. For example, in response to the provisioning of the subscription information, gateway 202 may invoke a provisioning of policies. The policies may relate to, for example, communication between MEC network 125 and a network device of external network 160 that hosts the divided application and the hosting of a function of the divided application in MEC network 125. The policies may also relate to the provisioning of a remainder function of the divided application that may use other network resources (e.g., core network 150, etc.).

Although FIG. 5 illustrates an exemplary process 500 of the MEC service, according to other embodiments, process 500 may include additional operations, fewer operations, and/or different operations than those illustrated in FIG. 5, and described herein. For example, as previously described, gateway 202 may obtain metric/configuration information from manager device 220, and provision this information in HSS/UDR/UDM 212, or another suitable network device.

Figure 6A:
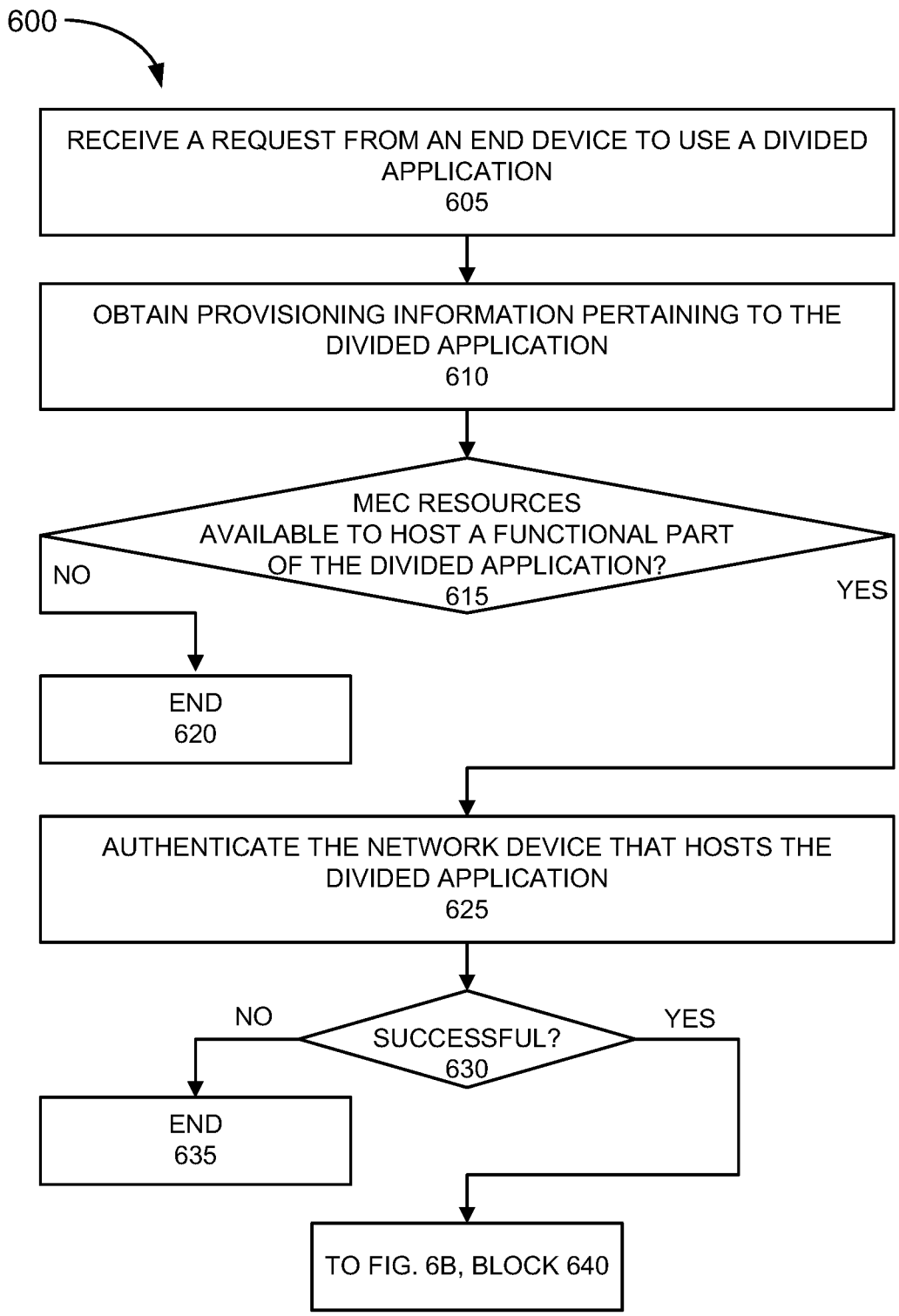
FIGS. 6A and 6B are flow diagrams illustrating another exemplary process of an exemplary embodiment of the MEC service.
Figure 6B:
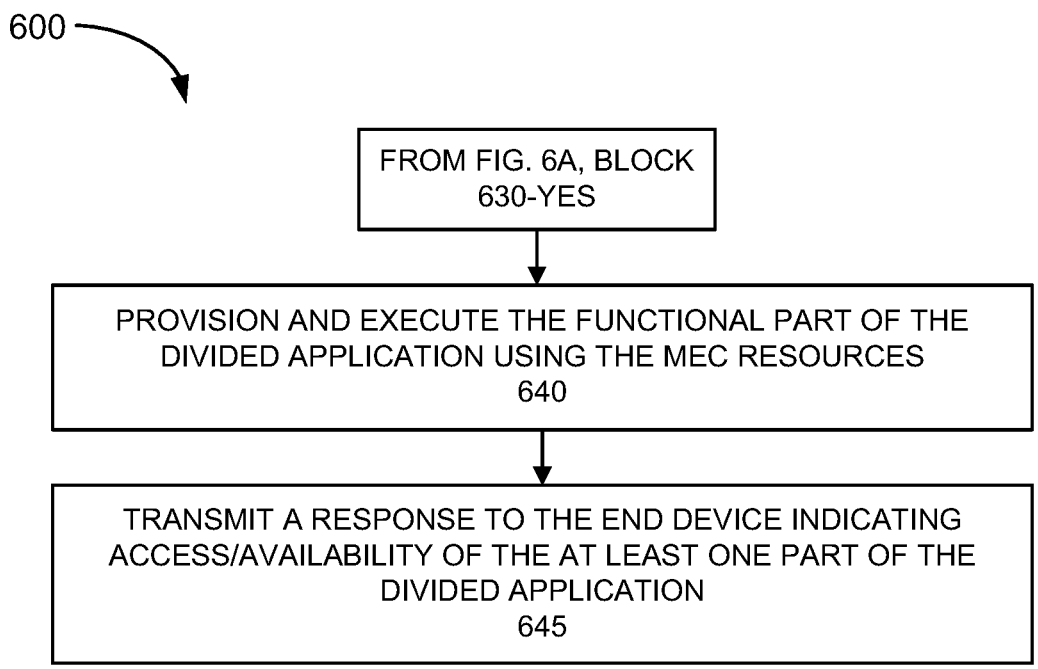

FIGS. 6A and 6B are flow diagrams illustrating an exemplary process 600 of another exemplary embodiment of the MEC service. According to an exemplary embodiment, network device 130 of MEC network 125 (e.g., gateway 202) that provides the MEC service, as described herein, may perform steps of process 600. For example, processor 410 executes software 420 to perform a step illustrated in FIGS. 6A and 6B, and described herein.

Referring to FIG. 6A, in block 605, for example, a request to use a divided application may be received from an end device. For example, end device 180 may include a client or a mobile application of a divided application. Gateway 202 may receive a request to use the divided application from end device 180.

In block 610, provisioning information pertaining to the divided application may be obtained. For example, gateway 202 may obtain subscription information pertaining to the divided application, and query whether MEC resources are available to support the function of the divided application. For example, gateway 202 may communicate with a management device of MEC network 125 that manages network resource allocation for applications/services hosted in MEC network 125. According to other implementations, gateway 202 may be a part of the management device of MEC network 125.

In block 615, it is determined whether MEC resources are available to host a functional part of the divided application. For example, based on a result of the query, gateway 202 may determine whether MEC resources are available.

When it is determined that there are insufficient MEC resources (block 615—NO), process 600 may end (block 620). For example, gateway 202 may transmit a response to end device 180 indicating that the function of the divided application is not available.

When it is determined that there are sufficient MEC resources (block 615—YES), the network device that hosts the divided application is authenticated (block 625). For example, gateway 202 (or a security device via gateway 202) may perform a security measure directed to divided application server 330. By way of further example, the security measure may include authentication and/or other measures, as previously described.

In block 630, it is determined whether the authentication is successful. For example, gateway 202 (or the security device) may determine whether the security measure has been successfully completed based on communication with divided application server 330.

When it is determined that the authentication is unsuccessful (block 630—NO), process 600 may end (block 635). For example, gateway 202 may transmit a response to end device 180 indicating that the function of the divided application is not available.

When it is determined that the authentication is successful (block 630—YES), the functional part of the divided application may be provisioned and executed using the MEC resources (block 640), as illustrated in FIG. 6B. For example, gateway 202 may coordinate the downloading of the functional part of the divided application to MEC resources (e.g., server 204) that have been allocated in MEC network 125.

In block 645, a response to the end device indicating access and availability of the at least one functional part of the divided application may be transmitted. For example, gateway 202 may generate and transmit a response to end device 180 indicating that the functional part of the divided application is available.

Although FIGS. 6A and 6B illustrate an exemplary process 600 of the MEC service, according to other embodiments, process 600 may include additional operations, fewer operations, and/or different operations than those illustrated in FIGS. 6A and 6B, and described herein. For example, the function of the divided application may be hosted by a network device external from the MEC (e.g., by a cloud device of a cloud network external from the MEC, etc.). In this way, the functions of the divided application may still be hosted by separate network devices and networks, as described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5, 6A, and 6B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a first network device of an edge computing network, subscription information pertaining to a divided application;
   provisioning, by the first network device, the subscription information in at least one of a home subscriber server or a user data management function;
   receiving, by the first network device after receiving the subscription information, a request from an end device to use a first function of the divided application, wherein the divided application is hosted by a second network device of an external network, and the divided application includes at least the first function and a second function;
   determining, by the first network device, whether network resources of the edge computing network are available to host the first function of the divided application based on the subscription information, wherein the determining comprises:
     transmitting, by the first network device to a third network device, a query request, which includes a unique identifier of the end device and data indicating at least one of the divided application or the first function of the divided application, and
     receiving, by the first network device from the third network device, a query response indicating that the network resources are available; and
   invoking, by the first network device, a provisioning of the first function to be hosted by a fourth network device of the edge computing network.

2. The method of claim 1, wherein the invoking comprises:
   causing, by the first network device, the second network device to download the first function of the divided application to the fourth network device.

3. The method of claim 1, further comprising:
   performing, by the first network device in response to determining that the network resources are available, one or multiple security measures directed to the second network device.

4. The method of claim 1, further comprising:
   receiving, by the first network device from the second network device, at least one of metric or configuration information pertaining to the first function.

5. The method of claim 1, further comprising:
   invoking, by the first network device, a provisioning of policies pertaining to the divided application with a policy control device.

6. The method of claim 1, wherein the provisioning of the first function to be hosted by the fourth network device includes using the subscription information.

7. The method of claim 1, further comprising:
   transmitting, by the first network device and to the end device, a message indicating that the first function is available in response to invoking the provisioning of the first function.

8. The method of claim 1, wherein the fourth network device is provisioned as a part of a network slice for access by the end device.

9. A network device comprising:
   a processor configured to:
     receive subscription information pertaining to a divided application;
     provision the subscription information in at least one of a home subscriber server or a user data management function;
     receive, after receipt of the subscription information, a request from an end device to use a first function of the divided application, wherein the divided application is hosted by a first network device of an external network, and the divided application includes at least the first function and a second function, wherein the network device is of an edge computing network;
     determine whether network resources of the edge computing network are available to host the first function of the divided application based on the subscription information, wherein, when determining, the processor is configured to:
       transmit to a second network device, a query request, which includes a unique identifier of the end device and data indicating at least one of the divided application or the first function of the divided application, and
       receive from the second network device, a query response indicating that the network resources are available; and
     invoke a provisioning of the first function to be hosted by a third network device of the edge computing network.

10. The network device of claim 9, wherein, when invoking, the processor is further configured to:
    cause the first network device to download the first function of the divided application to the third network device.

11. The network device of claim 9, wherein, when determining whether the network resources are available, the processor is further configured to:
    perform, in response to a determination that the network resources are available, one or multiple security measures directed to the first network device.

12. The network device of claim 9, wherein the processor is further configured to:
  receive from the first network device, at least one of metric or configuration information pertaining to the first function.

13. The network device of claim 9, wherein the processor is further configured to:
  invoke a provisioning of policies pertaining to the divided application with a policy control device.

14. The network device of claim 9, wherein the provisioning of the first function to be hosted by the third network device includes using the subscription information.

15. The network device of claim 9, wherein the processor is further configured to:
  transmit to the end device, a message indicating that the first function is available in response to the invocation of the provisioning of the first function.

16. The network device of claim 9, wherein the third network device is provisioned as a part of a network slice for access by the end device.

17. A non-transitory computer-readable storage medium storing instructions executable by a processor of a device of an edge computing network, which when executed cause the device to:
  receive subscription information pertaining to a divided application;
  provision the subscription information in at least one of a home subscriber server or a user data management function;
  receive, after receipt of the subscription information, a request from an end device to use a first function of the divided application, wherein the divided application is hosted by a first network device of an external network, and the divided application includes at least the first function and a second function;
  determine whether network resources of the edge computing network are available to host the first function of the divided application based on the subscription information, wherein the instructions to determine cause the device to:
    transmit to a second network device, a query request, which includes a unique identifier of the end device and data indicating at least one of the divided application or the first function of the divided application, and
    receive from the second network device, a query response indicating that the network resources are available; and
  invoke a provisioning of the first function to be hosted by a third network device of the edge computing network.

18. The non-transitory computer-readable storage medium of claim 17, wherein the instructions to invoke further comprise instructions, which when executed, cause the device to:
  cause the first network device to download the first function of the divided application to the third network device.

19. The non-transitory computer-readable storage medium of claim 17, wherein the instructions further comprise instructions, which when executed, cause the device to:
  invoke a provisioning of policies pertaining to the divided application with a policy control device.

20. The non-transitory computer-readable storage medium of claim 17, wherein the provisioning of the first function to be hosted by the third network device includes using the subscription information.

* * * * *